United States Patent [19]

Brussino

[11] Patent Number: 4,908,164

[45] Date of Patent: Mar. 13, 1990

[54] PROCEDURE FOR THE PRODUCTION OF MAGNETIC PLASTIC LAMINATE

[75] Inventor: Giovanni Brussino, Ceresole D'Alba, Italy

[73] Assignee: S.I.P.A.P. Sas Di Demichelis Margherita & C., Ceresole D'Alba, Fed. Rep. of Germany

[21] Appl. No.: 175,226

[22] Filed: Mar. 30, 1988

[30] Foreign Application Priority Data

Mar. 31, 1987 [IT] Italy ............................... 67252 A/87

[51] Int. Cl.$^4$ ...................... B29C 43/20; B29C 41/12; B29C 41/22
[52] U.S. Cl. .......................................... 264/22; 264/60; 264/67; 264/132; 264/136; 264/258; 264/319; 264/DIG. 58; 428/329; 428/530; 428/900
[58] Field of Search .................... 264/22, 56, 60, 61, 264/67, 104, 112, 134, 135, 136, 137, 132, 241, 258, 319, 261, DIG. 58; 428/329, 530, 900

[56] References Cited

U.S. PATENT DOCUMENTS

| | | | |
|---|---|---|---|
| 2,959,832 | 11/1960 | Baermann | 264/DIG. 58 |
| 3,333,333 | 8/1967 | Noack | 264/DIG. 58 |
| 3,602,986 | 9/1971 | Conwicke | 264/DIG. 58 |
| 3,717,578 | 2/1973 | Slijkerman | 264/DIG. 58 |
| 3,755,515 | 8/1973 | Cochardt | 264/DIG. 58 |
| 3,933,536 | 1/1976 | Doser | 264/DIG. 58 |
| 4,354,993 | 10/1982 | Kools | 264/DIG. 58 |
| 4,431,979 | 2/1984 | Stijntjes | 264/DIG. 58 |
| 4,707,313 | 11/1987 | Houle | 264/104 |

Primary Examiner—Jay H. Woo
Assistant Examiner—Jeremiah F. Durkin, II
Attorney, Agent, or Firm—Fleit, Jacobson, Cohn, Price, Holman & Stern

[57] ABSTRACT

Procedure for the production of magnetic plastic laminate in which at least one of the paper fiber sheets impregnated with phenolic and melaminic resins, is first of all spread, using the silk screen process, with a cloth with a weave of from 9 to 24 threads per cm$^2$, with a ferrous powder based paste with a percentage comprised of between 55%–80% and a binder with a percentage comprised of between 45%–20%; after drying the percentage of ferrous powders is comprised of between 75%–80%, the thickness of the paste of between 0.5 and 2.0 mm and the plastic laminate thus obtained is permanently magnetized through an electric charge thanks to the presence of the ferrous powders inside it.

11 Claims, No Drawings

PROCEDURE FOR THE PRODUCTION OF MAGNETIC PLASTIC LAMINATE

BACKGROUND OF THE INVENTION

The present invention relates to a procedure to obtain a magnetic plastic laminate and to the plastic laminate obtained through this procedure.

As is well known, the use of plastic laminates is very wide both as a covering material for furniture and internal decoration and for the production of panels for widely differing uses.

In certain particular cases there is a need to ready the laminate to allow the constraint put on it by objects equipped with permanent magnetism, which means that plastic laminate used as panels must be equipped with a thin sheet of metal or, as an alternative, with ferrous powders inserted in the plastic laminate composition.

This technique, although reaching the desired aim, brings with it the limitation of allowing application to the panels only of those objects which are magnetised. The aim of this present invention is that of obviating this inconvenience through a plastic laminate obtained using the traditional techniques but, thanks to its innovative composition, which can be magnetised so as to be able to constrain any object containing iron or iron alloy, thus avoiding magnetising of the object itself.

SUMMARY OF THE INVENTION

According to this present invention this aim is reached by making a plastic laminate into whose composition is inserted, between the various layers comprising the laminate, normally made up of paper fiber previously impregnated with phenolic and melaminic resins, a further layer of fiber treated in the same way on which is spread a paste obtained from the suitable mixing of ferrous compounds with a binder and preferably resins in the case in objects.

DESCRIPTION OF THE PREFERRED EMBODIMENT(S)

The following is a detailed description relative to the procedure in object and to the laminate thus obtained, given as an example and therefore not binding.

The procedure to obtain the magnetic laminate consists of a first stage where using the traditional technique, a sheet of paper fiber preferably of the type known as "Kraft", is impregnated with phenolic and melaminic resins and then dried in an oven. A mixture is then prepared by mixing together powders made up of ferrous oxides and barium or strontium carbonates with a binder made up of, for example, melaminic and acrylic resins. Ferrous powders which can be suitably used in the above described mixture are those derived from the grinding of scrap derived from the production of ferrite which in turn, is obtained from the sintering of ferrous oxides and barium or strontium carbides and, like the powders from which they have been obtained, they have excellent magnetising characteristics.

It has been verified that the mixture of ferrous powders described above with resins, used in the procedure in object, is effective in a percentage of ferrous powders varying between 55% and 80% and preferably comprised between 65%–75% and of resin between 45%–20% and preferably between 35%–25%.

The possibility is also foreseen of adding a percentage of water and/or thickeners to the mixture with the aim of making it easily spreadable.

The procedure continues with a spreading or depositing on the previously described sheet of impregnated paper of the mixture of ferrous and resin powders.

This operation should preferably be carried out using the silk screen process and using a cloth with a weave that can vary between 9 to 24 threads per $cm^2$ but preferably between 9 to 15 threads per $cm^2$.

As an alternative, the spreading or depositing stage can be carried out, for example, by spraying, calendaring or any kind of distributor able to give a uniform thickness to the layer spread on or deposited.

After the spreading stage the product is naturally or oven dried. After the drying state, the layer on the impregnated sheet of paper which has become solid should have a thickness varying from 0.5 mm to 2.0 mm, but preferably of 2.0 mm, and a percentage of ferrous compound in respect of the binder comprised between 75%–85% but preferably 80%.

The sheet obtained through the above described procedure is then, using the traditional die-casting technique, inserted between the various layers of impregnated paper fiber, obtaining in this manner a plastic laminate which comprises, internally, a layer of magnetisable material.

Lastly, at this point using the traditional technique, permanent magnetisation of the laminate is carried out through an electrical charge.

Depending on the type of use of the laminate, the magnetisable material can be isolated to a greater or lesser degree giving a greater or lesser thickness to the laminate and a greater or lesser force of attraction.

Obviously the laminate can be predisposed to attract with its upper surface, or viceversa with its under surface, depending on how the magnetic layer is disposed, just as it can attract with both surfaces if furnished with two layers of magnetic material.

From that stated above, the usefulness of the described procedure is made clear, as it permits a magnetic plastic laminate to be obtained which can be used for many various uses, such as, for example, for covering tables or flat surfaces generally in railway carriages, ships or caravans, in which the constraint of objects such as crockery to the mentioned flat surfaces is useful.

The laminate can also be used for the production of miscellaneous panels or maps, in which the necessity of constraint of the objects used in connection with the laminate is again necessary, and which will no longer need to be magnetised individually which obviously gives great economic benefits.

Naturally, considering the procedure principle describing the invention in object, and laminate obtained through said procedure, its practical production may vary widely especially with regard to the mix percentage of the ferrous compounds with the binder variable according to the granulometry of ferrous powders, and the paste application method, without, the same, going beyond the limits of the present invention, as protected by the following claims.

I claim:

1. A process for producing a magnetic plastic laminate, said process comprising the steps of:
   impregnating at least three sheets of paper fiber with phenolic and melaminic resins and oven drying the impregnated paper fiber sheets;

applying a paste on at least one of said dried impregnated paper fiber sheets, said paste comprising a ferrous powder in an amount of 55% to 80% and a binder in an amount of 45% to 20%, said binder being a resin;

drying said paper fiber sheet having paste thereon, the thickness of the paste after drying being between 0.5 and 2.0 mm and the percentage of ferrous powder in the paste after drying being between 75% and 85%;

inserting said paper fiber sheet having paste thereon between the other two dried impregnated paper fiber sheets and hot pressing the resultant layered structure to produce a laminate; and then applying an electrical charge to said laminate to permanently magnetize the laminate thereby producing a magnetic plastic laminate.

2. A process according to claim 1, wherein said paste is applied on said at least one impregnated paper fiber sheet by silk screening using a weave of from 9 to 24 threads per cm².

3. A process according to claim 1, wherein said ferrous powder is obtained from the grinding of ferrite, which ferrite is obtained through the sintering of ferrous oxides and barium and strontium carbonates.

4. A process according to claim 1, wherein said binder is a member selected from the group consisting of acrylic resins, melaminic resins and mixtures thereof.

5. A process according to claim 1, wherein the percentage of ferrous powder in said paste is between 65% and 75%.

6. A process according to claim 1, wherein the percentage of binder in said paste is between 35% and 25%.

7. A process according to claim 1, wherein the percentage of ferrous powder in said paste after drying is about 80%.

8. A process according to claim 1, wherein the thickness of the paste after drying is about 2.0 mm.

9. A process according to claim 1, wherein the paste is applied by silk screening using a cloth with a weave made up of from 9 to 15 threads per cm².

10. A process according to claim 1, wherein the paste is applied by calendaring.

11. A process according to claim 1, wherein the paste is applied by spraying.

* * * * *